(12) United States Patent
Okamoto et al.

(10) Patent No.: US 11,529,569 B2
(45) Date of Patent: Dec. 20, 2022

(54) COLUMN TUBE FOR CHROMATOGRAPHY, AND COLUMN FOR CHROMATOGRAPHY EMPLOYING SAME

(71) Applicant: DAICEL CORPORATION, Osaka (JP)

(72) Inventors: Ichiro Okamoto, Osaka (JP); Takafumi Onishi, Myoko (JP); Tsuyoshi Maruyama, Myoko (JP)

(73) Assignee: DAICEL CORPORATION, Osaka (JP)

( * ) Notice: Subject to any disclaimer, the term of this patent is extended or adjusted under 35 U.S.C. 154(b) by 107 days.

(21) Appl. No.: 16/614,156

(22) PCT Filed: May 15, 2018

(86) PCT No.: PCT/JP2018/018711
§ 371 (c)(1),
(2) Date: Nov. 15, 2019

(87) PCT Pub. No.: WO2018/212165
PCT Pub. Date: Nov. 22, 2018

(65) Prior Publication Data
US 2020/0070065 A1    Mar. 5, 2020

(30) Foreign Application Priority Data
May 16, 2017  (JP) .............. JP2017-097355

(51) Int. Cl.
*B01D 15/22* (2006.01)
*B01D 15/40* (2006.01)
(Continued)

(52) U.S. Cl.
CPC ............. *B01D 15/22* (2013.01); *B01D 15/40* (2013.01); *G01N 30/6052* (2013.01); *G01N 30/02* (2013.01)

(58) Field of Classification Search
CPC .... B01D 15/22; B01D 15/40; G01N 30/6052; G01N 30/02
See application file for complete search history.

(56) References Cited

U.S. PATENT DOCUMENTS 3,866,308 A * 2/1975 Halasz ............... G01N 30/6052
29/527.4
2009/0184052 A1 7/2009 Agren
(Continued)

FOREIGN PATENT DOCUMENTS

CN 101925814 A 12/2010
CN 106062551 A 10/2016
(Continued)

OTHER PUBLICATIONS

MicroGroup, "ID Honing". Internet Archive. May 30, 2015.*
(Continued)

*Primary Examiner* — Benjamin L Lebron
(74) *Attorney, Agent, or Firm* — Birch, Stewart, Kolasch & Birch, LLP (57) ABSTRACT

Provided is a column tube for chromatography that can prevent a peak shape abnormality referred to as a foot in a resulting chromatogram. The object is accomplished by the column tube for chromatography, through which a fluid flows, this column tube including a plurality of polishing traces extending on an inner circumferential surface of the column tube in a flow direction of the fluid.

13 Claims, 7 Drawing Sheets

(51) Int. Cl.
    *G01N 30/02*     (2006.01)
    *G01N 30/60*     (2006.01)

(56) References Cited

U.S. PATENT DOCUMENTS

| | | |
|---|---|---|
| 2010/0107783 A1 | 5/2010 | Maeda |
| 2012/0315068 A1 | 12/2012 | Fukumoto et al. |
| 2016/0231293 A1 | 8/2016 | Yin et al. |

FOREIGN PATENT DOCUMENTS

| | | |
|---|---|---|
| JP | 4-322657 A | 11/1992 |
| JP | 9-119924 A | 5/1997 |
| JP | 2000-239033 A | 9/2000 |
| WO | WO 90/07468 A1 | 7/1990 |

OTHER PUBLICATIONS

Reay, David, et al. "Heat Pipes: Theory, Design and Applications", Chapter 5: Heat pipe manufacture and testing, pp. 169-213. Elsevier Science & Technology. (Year: 2006).*
Indian Office Action for Indian Application No. 201947049675, dated Oct. 1, 2021, with English translation.
Extended European Search Report, dated Apr. 20, 2020, for European Application No. 18802540.7.

* cited by examiner

COLUMN TUBE FOR CHROMATOGRAPHY, AND COLUMN FOR CHROMATOGRAPHY EMPLOYING SAME

TECHNICAL FIELD

The present invention relates to a novel column tube for chromatography, and a column for chromatography employing the same.

BACKGROUND ART

A chromatograph such as a liquid chromatograph or a supercritical fluid chromatograph typically includes a column tube including a separating agent (stationary phase) for separating components to be separated, the components having been introduced into a fluid as a mobile phase.

In the related art, for column tubes that are used in chromatographs, during a process of manufacturing the same, polishing of an inner surface of the tube is omitted, or a method of polishing with no directionality is used, in which the inner surface of the tube is uniformly polished as in electropolishing, or a method is used, in which buffing is performed in a circumferential direction of the tube.

In addition to these methods, a method referred to as honing is well known, in which an inner circumferential surface of a tube material is polished by polishing processing implemented in a combination of a rotating motion and a reciprocating motion.

In addition, it is commonly known in this technical field that the surface of an inner circumferential surface of a column tube has to be as smooth as possible (Patent Document 1).

CITATION LIST

Patent Document

Patent Document 1: JP 09-119924 A

SUMMARY OF INVENTION

Technical Problem

Figure 1:
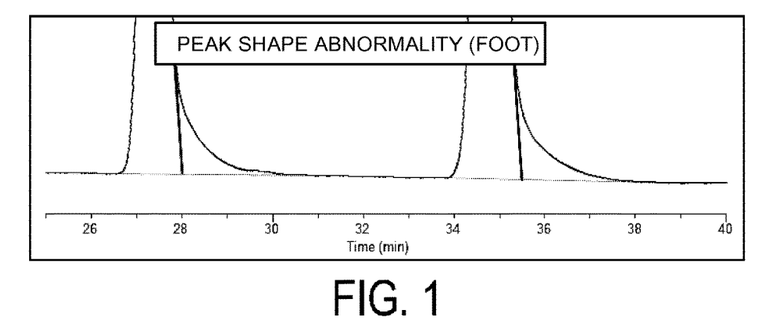
FIG. 1 is a diagram illustrating a peak shape abnormality (foot) observed in a case where a known column tube is used.

In the above-described chromatograph using a known column tube that is not polished or that is polished by using an already available method, a resulting chromatogram contains a long-lasting peak-shape abnormality, which is located near the end of a peak and referred to as a foot (see FIG. 1).

This phenomenon is significantly exhibited particularly in a case where a known column tube is used as a sorting column. For prevention of this phenomenon, arranging, for example, distribution plates, such as porous plate members, at both end portions of the column tube has been studied. However, a complete solution has not been made.

An object of the present invention is to provide a column tube for chromatography that can prevent a peak shape abnormality referred to as a foot in a resulting chromatogram.

Solution to Problem

As a result of intensive research, the present inventors have found that the object described above can be accomplished by a column tube for chromatography including, on an inner circumferential surface thereof, a plurality of polishing traces extending in a flow direction of a fluid.

Embodiments of the present invention may include the following.

[1] A column tube for chromatography, through which a fluid flows, the column tube including a plurality of polishing traces extending in a flow direction of the fluid, on an inner circumferential surface of the column tube.

[2] The column tube for chromatography according to [1], wherein the polishing traces extending in the flow direction of the fluid extend at an angle of 30° or less with respect to the flow direction of the fluid.

[3] The column tube for chromatography according to [1] or [2], wherein the polishing traces extending in the flow direction of the fluid exist over an area that accounts for 90% or higher of a total area of the inner circumferential surface.

[4] The column tube for chromatography according to any one of [1] to [3], wherein a ratio, to a total number of polishing traces, of a number of polishing traces having a depth in a range from 0.01 to 50 μm and a width in a range from 0.01 to 100 μm is 70% or higher.

[5] The column tube for chromatography according to any one of [1] to [4], wherein the number of polishing traces extending in the flow direction of the fluid is equal to or higher than 90% of the total number of polishing traces.

[6] The column tube for chromatography according to any one of [1] to [5], wherein an inner diameter is from 0.7 to 200 mm.

[7] A column for chromatography including: the column tube according to any one of [1] to [6]; and a separating agent filled inside the column tube.

[8] The column for chromatography according to [7], further including a connector configured to connect the column tube and tubing, through which the fluid flows.

[9] The column for chromatography according to [8], wherein the column for chromatography is used for high performance liquid chromatography or supercritical fluid chromatography.

[10] A method for manufacturing a column tube for chromatography, the method including providing polishing traces to an inner circumferential surface of a tube material in a longitudinal axial direction of the tube material by inserting a polishing shaft rod having a polishing member into the tube material and reciprocating the tube material.

Effects of Invention

A column tube for chromatography can be provided that can prevent a peak shape abnormality referred to as a foot.

DESCRIPTION OF EMBODIMENTS

A column tube for chromatography according to an embodiment of the present invention (also simply referred to as a column tube) includes, on an inner circumferential surface thereof, a plurality of polishing traces extending in a flow direction of a fluid.

The polishing traces as used herein refer to streak-like polishing traces resulting from mechanical polishing.

A single polishing trace may have a depth ranging from 0.01 to 50 µm, preferably from 0.05 to 20 µm, and more preferably from 0.1 to 5 µm.

Additionally, a single polishing trace may have a width ranging from 0.01 to 100 µm, preferably from 0.02 to 80 µm, and more preferably from 0.03 to 50 µm.

In an aspect of the column tube according to an embodiment of the present invention, on the inner circumferential surface, the ratio, to a total number of polishing traces, of the number of polishing traces having a depth ranging from 0.01 to 50 µm and a width ranging from 0.01 to 100 µm is 70% or higher. The ratio is preferably 80% or higher, and more preferably 85% or higher. The ratio, and the width and depth of the polishing traces can be adjusted by adjusting the roughness of a polishing member that is used when the inner circumferential surface of the column tube is polished and adjusting a period of time for polishing.

The existence of polishing traces, which have appropriate widths and depths, at a higher percentage on the inner circumferential surface of the column tube contributes to exertion of the effect of the embodiment of the present invention.

Note that the depth and width of the polishing traces can be obtained by capturing an image of the inner circumferential surface of the column tube using a non-contact surface/layer cross-sectional shape measurement system and processing the image using a computer included in the system.

On the inner circumferential surface of the column tube according to the embodiment of the present invention, the polishing traces extend in the flow direction of the fluid in the column tube (also referred to as a longitudinal axial direction or simply a vertical direction in a case where the length of the column tube in the flow direction of the fluid is larger than the outer diameter of the column tube). Not only polishing traces extending parallel to (an angle of 0°) the flow direction of the fluid in the column tube but also polishing traces extending at an angle of 30° or less as viewed from the flow direction of the fluid in the column tube are assumed to correspond to the wording "polishing traces extending in the flow direction of the fluid".

Figure 2:
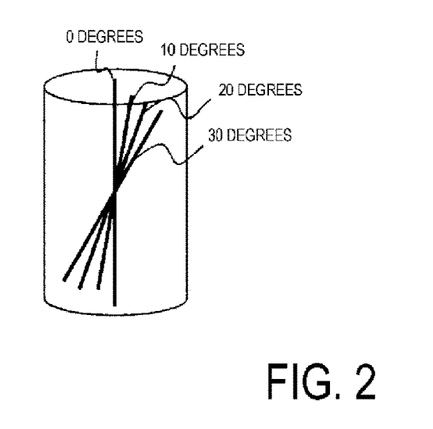
FIG. 2 is a diagram schematically illustrating an aspect of polishing traces extending in a flow direction of a fluid in a column tube (longitudinal axial direction).

The angle as viewed from the flow direction of the fluid is more preferably 20° or less, and still more preferably 10° or less. These are schematically illustrated in FIG. 2.

In the column tube for chromatography of the embodiment of present invention, the polishing traces extending in the flow direction of the fluid preferably exist over an area that accounts for 90% or higher of a total area of the inner circumferential surface of the column tube. The existence of the polishing traces at such a rate on the inner circumferential surface of the column tube contributes to achieving the effect of the present invention. The ratio is more preferably 93% or higher, and still more preferably 95% or higher.

Figure 3A:
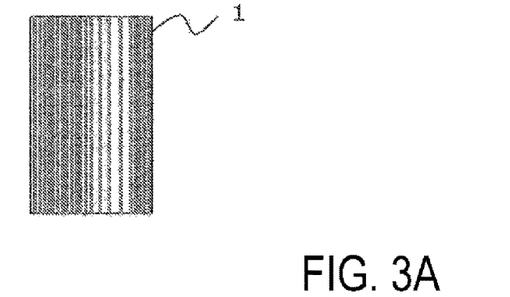
FIG. 3A is a schematic diagram illustrating an aspect of polishing traces present on an inner circumferential surface of the column tube.

This is schematically illustrated in FIG. 3A. In FIG. 3A, the polishing traces extending in the flow direction of the fluid are illustrated as polishing traces 1.

Note that, in this Specification, when area, in which the polishing traces extending in the flow direction of the fluid in the column tube are present, is determined, the following definition is used: i.e., when a 0.2 µm square is observed at any three points on the inner circumferential surface in a case where the number of polishing traces is one or more, the polishing traces are present in the 0.2 µm square.

In addition, in the column tube for chromatography according to the embodiment of the present invention, the number of the polishing traces extending in the flow direction of the fluid is preferably 90% or higher and more preferably 93% or higher of the number of all the polishing traces including polishing traces that do not extend in the flow direction of the fluid.

Figure 3B:
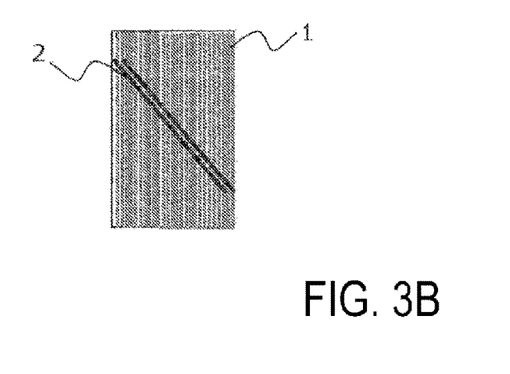
FIG. 3B is a schematic diagram illustrating another aspect of polishing traces present on the inner circumferential surface of the column tube.

This is schematically illustrated in FIG. 3B. FIG. 3B illustrates an aspect in which polishing traces extending in the flow direction of the fluid are illustrated as the polishing traces 1 and in which polishing traces 2 exist extending in a direction different from the flow direction of the fluid (the polishing traces 2 exist at an angle higher than 30° with respect to the flow direction of the fluid).

In a process of manufacturing the column tube according to the embodiment of the present invention, in rare cases, polishing traces extending in the flow direction of the fluid in the column tube and polishing traces extending in other directions coexist. In the embodiment of the present invention, as few as possible of such polishing traces exist.

In this Specification, examples of the chromatography may include high performance liquid chromatography and supercritical fluid chromatography.

Examples of a material for the column tube may include stainless steel and polyetheretherketone (PEEK).

A tube material that is made from these materials and manufactured based on a known method can be utilized.

For example, in a case where the tube material is stainless steel, first, a seamless pipe serving as a raw tube is prepared, and bright annealing, which is a known method, is performed to obtain a BA tube. Then, the tip of the seamless BA tube is squeezed, and the tube is drawn out through a forming member referred to as a dice. Thus, a tube material for a column tube can be obtained.

In a case where the column tube is made from stainless steel, the tube material obtained via the process described above may be subjected to normal surface treatment, for example, electropolishing or chemical polishing, and the resultant tube material may be used for manufacturing a column tube according to the embodiment of the present invention.

In a case where the tube material is made from PEEK, a commercially available tube material may be used.

As for the inner diameter of the column tube for chromatography according to the embodiment of the present invention, a range used in normal chromatography can be employed. For example, the inner diameter may be appropriately set to a range from 0.7 to 200 mm, depending on an intended use, e.g., analysis or sorting. Examples of an upper-limit inner diameter may include 70 mm, and may include 50 mm. Among these in the range, the inner diameter may specifically be, for example, 0.7 mm, 1.0 mm, 1.5 mm, 2.0 mm, 3.0 mm, 4.6 mm, 6.0 mm, 10 mm, 20 mm, 30 mm, 50 mm, 100 mm, 150 mm, or 200 mm.

As for the length of the column tube for chromatography according to the embodiment of the present invention, the same length as that of a column tube used in chromatography may be employed. For example, depending on the intended use, e.g., analysis or sorting, the length may be less than 50 mm, equal to or greater than 50 mm and less than 100 mm, equal to or greater than 100 mm and less than 250 mm, or greater than 250 mm.

A column tube according to the embodiment of the present invention filled with a separating agent for a target material may be utilized as a column body constituting a chromatographic column for liquid chromatography, supercritical fluid chromatography, or the like.

The separating agent filled inside the column tube according to the embodiment of the present invention is not particularly limited, and examples of a separating agent include a separating agent used in size exclusion chromatography (SEC), a separating agent used in ion exchange chromatography (anion exchange or cation exchange), a separating agent used in adsorption chromatography, a separating agent used in partition (reverse phase) chromatography, a separating agent for optical isomers, and a separating agent of an inner-surface reverse phase type.

These separating agents are preferably particulate and typically have a particle diameter from 1 to 20 µm.

The column tube according to the embodiment of the present invention functions as a column for chromatography by being internally filled with the separating agent as described above. A method for filling the above-described separating agent into the column tube is not limited, and a slurry method, for example, may be used.

An aspect of the column for chromatography may include connectors provided at both end portions of the column tube and used to connect tubing, through which a fluid serving as a mobile phase flows, with a column tube (column body) internally filled with a separating agent. Alternatively, another aspect of the column tube for chromatography may include filters installed at both end portions of a column tube filled with a separating agent and include no connector as in the case of a cartridge column.

Figure 4:
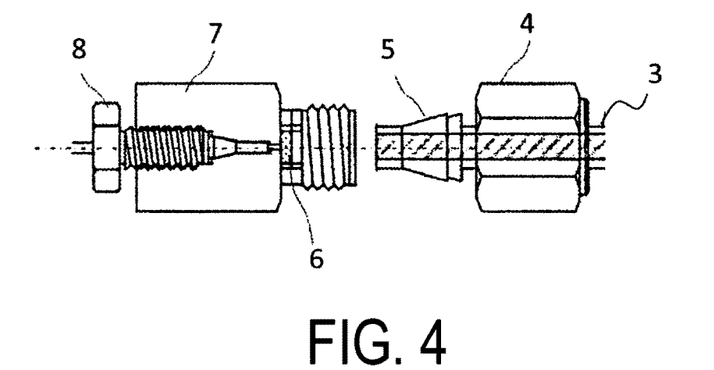
FIG. 4 is a diagram illustrating an example of an aspect of connection between the column tube and tubing, through which the fluid flows.
Figure 5:
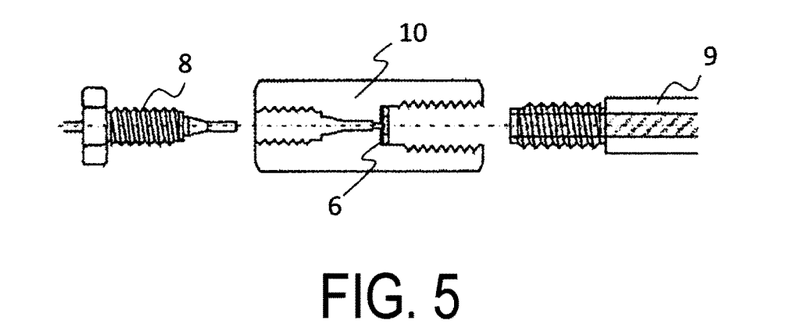
FIG. 5 is a diagram illustrating another example of the aspect of connection between the column tube and the tubing through, which the fluid flows.

An example in which connectors are provided at both end portions of a column tube will be described with reference to FIG. 4 and FIG. 5. FIG. 4 and FIG. 5 each illustrate a typical example, and the embodiment of the present invention is not limited to these examples.

FIG. 4 is an enlarged view of a portion of an example in which outer surfaces of both end portions of a column tube 3 are used without performing any particular processing thereon. Connectors 7 provided at both end portions of the column tube 3 are fixed by being threadably engaged with nuts 4 via ferrules 5 fitted on both end portions of the column tube 3.

As illustrated in FIG. 4, a filter 6 may be provided inside each of the connectors 7. In the aspect in FIG. 4, in a case where the column body is connected to the tubing, through which a fluid flows, the connection can be achieved by screwing, into the connector 7, a setscrew 8 through which the tubing is passed.

On the other hand, FIG. 5 is an enlarged view of a portion of an example in which the outer surfaces of both end portions of the column tube 9 are threaded. A connector 10 in FIG. 5 is provided, at one end thereof, with a thread groove threadably engaged with a threaded portion of an end portion of the column tube 9, and, at the other end thereof, with a thread groove threadably engaged with the setscrew 8. In addition, as in the case of FIG. 4, the connector 10 may be provided with a filter 6. In the aspect in FIG. 5, in a case where the column body is connected to the tubing, through which a fluid flows, the connection may be achieved by screwing the setscrew 8, through which the tubing is passed, into the connector 10 threadably engaged with column tube 9.

Method for Manufacturing Column Tube

The method for manufacturing the column tube according to the embodiment of the present invention includes polishing in which a polishing shaft rod having a polishing member is inserted into a tube material used as a raw material, then the tube material is reciprocated, and thus polishing traces are provided to an inner circumferential surface of the tube material in a longitudinal axial direction.

The tube material used as a raw material may be a tube material for the column tube made from stainless steel, PEEK, or the like described above. The length of the column tube material subjected to the above-described process may be approximately 1 m, but may not be limited to such a length. In addition, the tube material used as a raw material may be subjected to surface treatment such as electropolishing or chemical polishing.

The polishing member of the polishing shaft rod is not particularly limited, and may be a buff including, on a surface thereof, a polishing agent.

Conditions for reciprocation of the tube material are not particularly limited as long as the polishing traces described above are provided to the inner circumferential surface.

Examples of an apparatus used to perform the above-described process include an apparatus described in JP 56-121553 UM-A. In the apparatus described in the document, a mechanism is provided in which a tube material having an inner circumferential surface that is to be polished is reciprocated, with the above-described polishing shaft rod being fixed. However, this apparatus essentially requires a mechanism for rotating the tube material in the circumferential direction. The document also describes rotation of the polishing shaft rod in the circumferential direction of the tube material. Moreover, the document explicitly describes reciprocating the tube material in the longitudinal direction while rotating the tube material in the circumferential direction. The apparatus thus performs honing.

The document does not describe the concept that the tube material is simply reciprocated to polish the inner circumferential surface thereof, in other words, the inner surface of the tube member is polished only in the longitudinal axial direction, to provide polishing traces to the inner circumferential surface in the longitudinal axial direction.

In addition, the above-described document describes a need to smoothly finish the inner circumferential surface of the tube material, and this clearly differs from the concept of the present invention.

The method for manufacturing the column tube according to the embodiment of the present invention may include: after the above-described polishing, severing in which, for example, the column tube is severed into an appropriate length depending on the intended use of the column; cutting such as performing threading on the resulting column tube; and then finishing such as performing cleaning to bring the column tube into a state appropriate as a product.

EXAMPLES

Examples will be described below, but the present invention is not limited to these examples.

Examples 1 to 3

A commercially available stainless steel column tube (inner diameter: 20 mm, length: 1000 mm) was prepared.

A polishing device including a polishing shaft rod was used, with this polishing shaft rod including, at the tip thereof, a polishing member (abacus beads with sandpaper attached thereto). The polishing shaft rod was inserted into the stainless steel column tube and reciprocated, thereby producing a column tube having polishing traces provided to the inner circumferential surface of the stainless steel column tube. The column tube was severed into a length of 250 mm.

By the above-described operation, the polishing traces were formed on the inner circumferential surface of the column tube along the longitudinal direction (the flow direction of a fluid) of the column tube (vertical polishing).

Figure 6A:
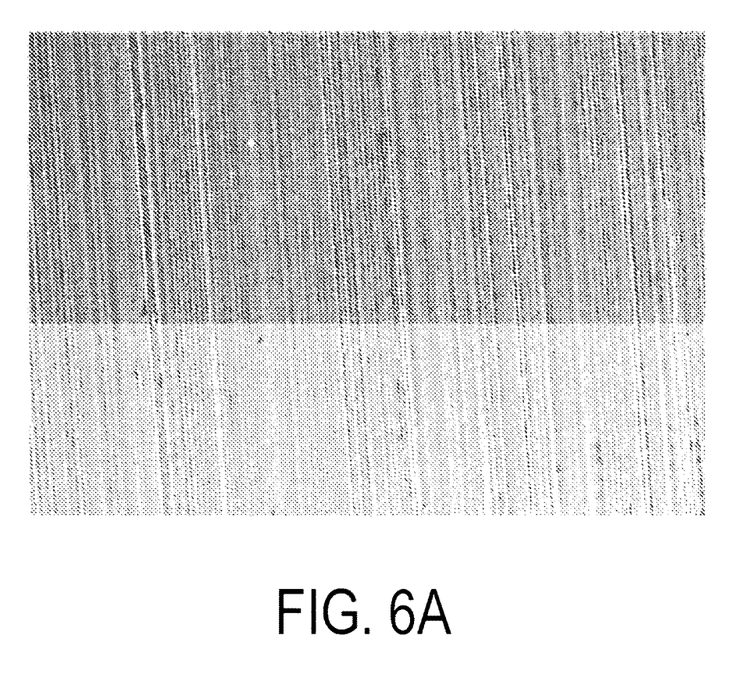
FIG. 6A is a diagram illustrating an SEM image (photograph) of an inner circumferential surface of a column tube produced in Example 1 (all 500% magnification).
Figure 6B:
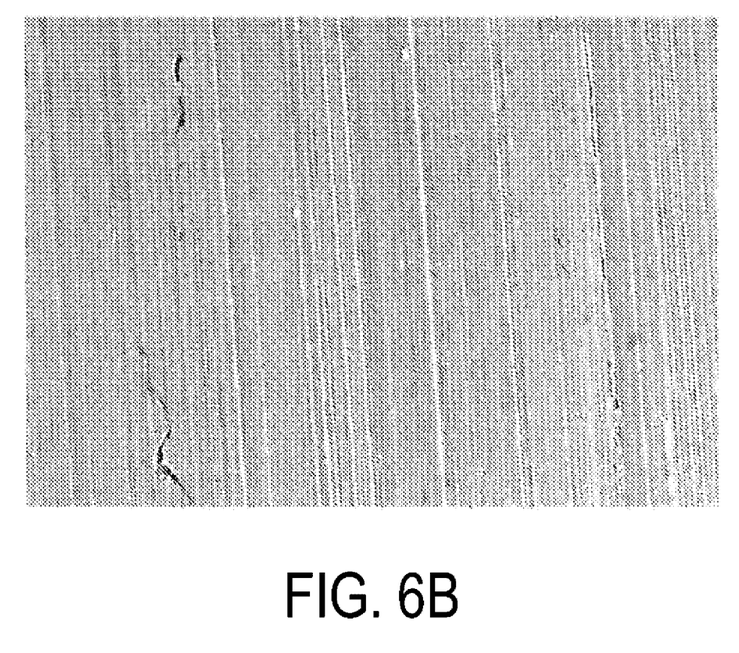
FIG. 6B is a diagram illustrating an SEM image (photograph) of an inner circumferential surface of a column tube produced in Example 2 (500% magnification).
Figure 6C:
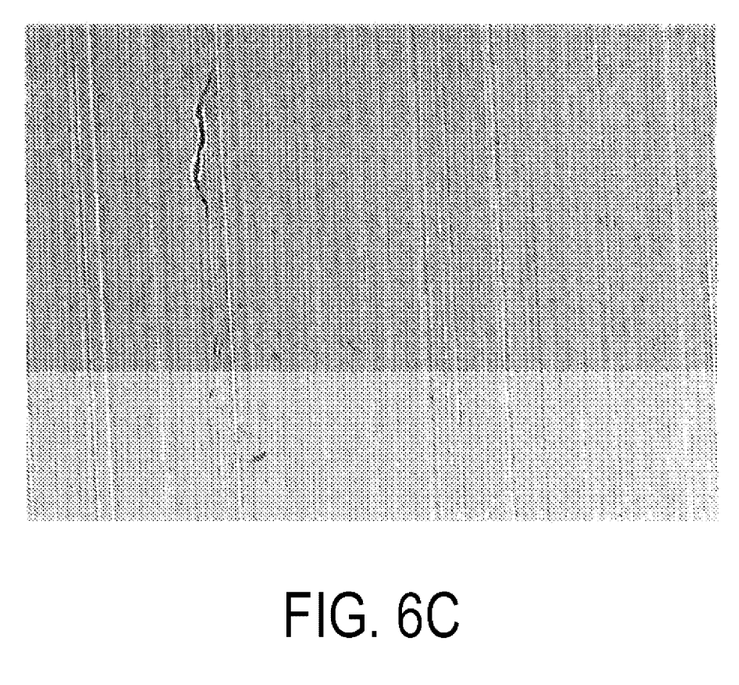
FIG. 6C is a diagram illustrating an SEM image (photograph) of an inner circumferential surface of a column tube produced in Example 3 (500% magnification).

Three types of column tubes were produced with sandpaper of various surface roughness (Example 1: #300, Example 2: #400, and Example 3: #600). FIGS. 6A to 6C illustrate photographs of the inner circumferential surfaces of the column tubes in Examples 1 to 3 taken with a scanning electron microscope (500% magnification).

In each of the column tubes obtained in Examples 1 to 3, the polishing traces extending in the longitudinal axial direction of the column tube accounted for approximately 95% or higher (Example 1), approximately 95% or higher (Example 2), approximately 95% or higher (Example 3) of the total area of the inner circumferential surface of the column tube.

In addition, a ratio, to the total number of polishing traces, of the number of polishing traces having a depth in a range from 0.01 to 50 μm and a width in a range from 0.01 to 100 μm was approximately 95% or higher (Example 1), approximately 95% or higher (Example 2), and approximately 95% or higher (Example 3).

The number of polishing traces extending in the longitudinal axial direction was approximately 95% or higher (Example 1), approximately 95% or higher (Example 2), and approximately 95% or higher (Example 3) of the total number of polishing traces.

Comparative Example 1

The polishing shaft rod of the above-described polishing device was inserted into the commercially available stainless steel column tube prepared in Example 1. The polishing shaft rod was then rotated in the direction (circumferential direction of the stainless steel tube) orthogonal to the insertion direction of the shaft rod, whereby the stainless steel column tube having polishing traces provided to the inner circumferential surface thereof was produced.

Figure 6D:
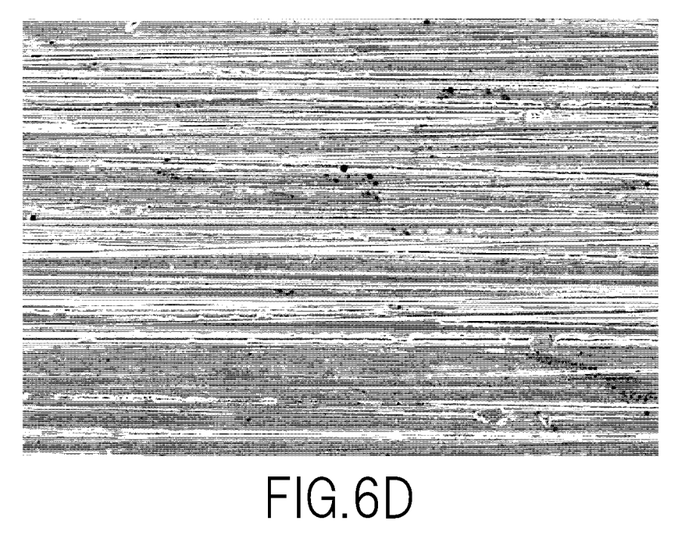
FIG. 6D is a diagram illustrating an SEM image (photograph) of an inner circumferential surface of the column tube produced in Comparative Example 1 (500% magnification).

By the above-described operation, the polishing traces were formed on the inner circumferential surface of the column tube along the circumferential direction (direction orthogonal to the flow direction of a fluid) of the column tube (lateral polishing). FIG. 6D illustrates a photograph of the inner circumferential surface of the column tube in Comparative Example 1, taken with a scanning electron microscope (500% magnification).

Comparative Example 2

The polishing shaft rod of the above-described polishing device was inserted into the commercially available stainless steel column tube prepared in Example 1. The polishing shaft rod was then rotated in the direction (circumferential direction of the stainless steel tube) orthogonal to the insertion direction of the shaft rod and reciprocated in the insertion direction, whereby the stainless steel column tube having polishing traces provided to the inner circumferential surface of the column tube was produced.

Figure 6E:
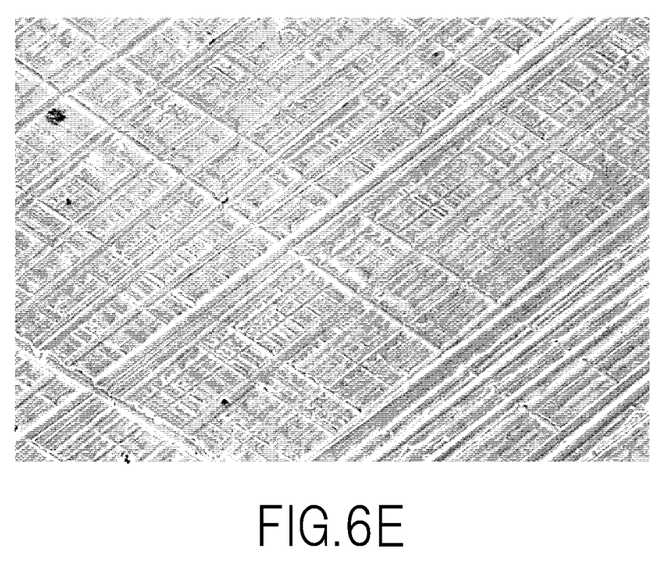
FIG. 6E is a diagram illustrating an SEM image (photograph) of an inner circumferential surface of a column tube produced in Comparative Example 2 (500% magnification).

By the above-described operation, polishing traces were formed on the inner circumferential surface of the column tube, with these polishing traces extending obliquely with respect to the flow direction of the fluid in the column tube (longitudinal direction) and the circumferential direction of the column tube (honing). FIG. 6E illustrates a photograph of the inner circumferential surface of the column tube in Comparative Example 2, taken with a scanning electron microscope (500% magnification).

Additionally, the depth and width of each of the polishing traces were measured from an SEM image of the inner circumferential surface of each column tube. The results are indicated in Table 1.

TABLE 1

|  | Depth (μm) | Width (μm) |
| --- | --- | --- |
| Example 1 | 0.5 | 50 |
| Example 2 | 0.5 | 10 to 20 |
| Example 3 | 0.5 | 5 to 10 |
| Comparative Example 1 | 0.8 | 5 to 10 |
| Comparative Example 2 | 0.3 | 5 to 10 |

Production of Column for High Performance Liquid Chromatography

Each of the column tubes produced as described above was employed as a column body to be filled with a separating agent for high performance liquid chromatography.

The column body was internally filled with (CHIRALCEL OJ-H, particle size: 5 μm) as a separating agent by a slurry method, and a ferrule and a nut were placed at both ends (liquid inlet and liquid outlet) of the column body. An end connector to be threadably engaged with the nut was threadably engaged with the nut, whereby a column for high performance liquid chromatography was produced.

Separation Tests

Tests were performed in which each of the columns produced as described above was used to separate a test sample (trans-Stilbene oxide) by high performance liquid chromatography.

Conditions for high performance liquid chromatography are as follows.
  Eluant: n-hexane/2-propanol=90/10
  Flow rate: 6.0 mL/min.
  Column temperature: 25° C.
  Detector: 254 nm Separation Results The samples were separated by using each of the produced columns for the high performance liquid chromatography, and resulting chromatograms are illustrated in FIG. 7 and FIG. 8.

Figure 9:
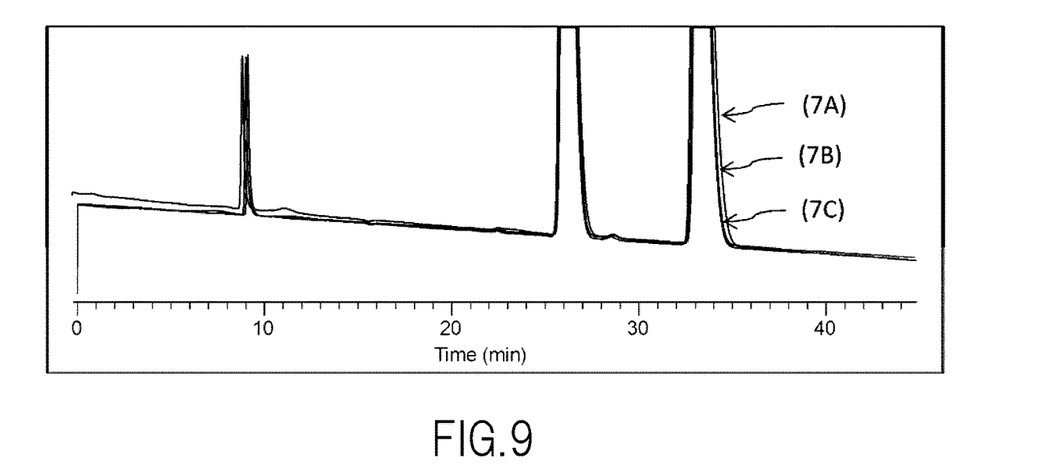
FIG. 9 is a diagram illustrating portions of chromatograms obtained by using the columns produced using the column tubes in Examples, with the portions being enlarged and superimposed one another (7A to 7C in the figure correspond to the drawing numbers).
Figure 10:
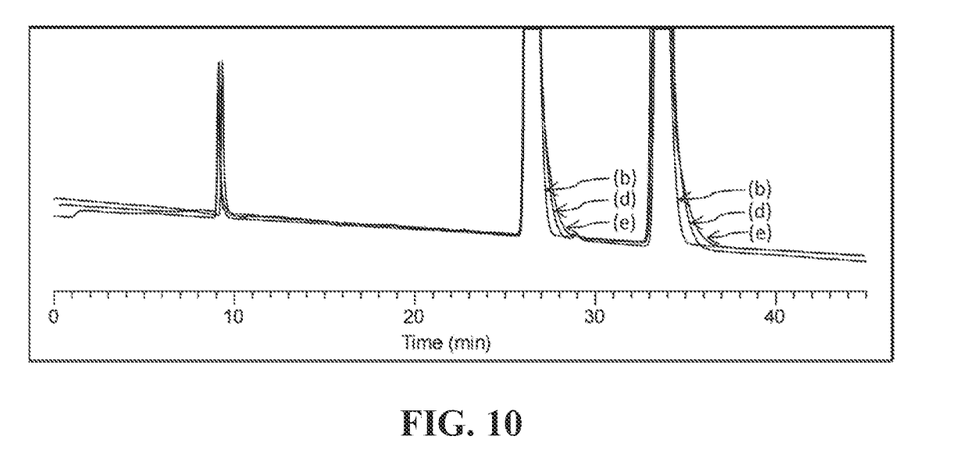
FIG. 10 is a diagram illustrating portions of chromatograms obtained by using the columns produced using the column tubes in Examples and Comparative Examples, with the portions being enlarged and superimposed one another (7B, 8A, and 8B in the figure correspond to the drawing numbers).

In addition, FIG. 9 and FIG. 10 illustrate, for comparison of the degree of a foot at a peak end portion of each of the chromatograms obtained, the chromatograms displayed superimposed one another, with the peak start and peak end of each chromatogram being enlarged.

Figure 7A:
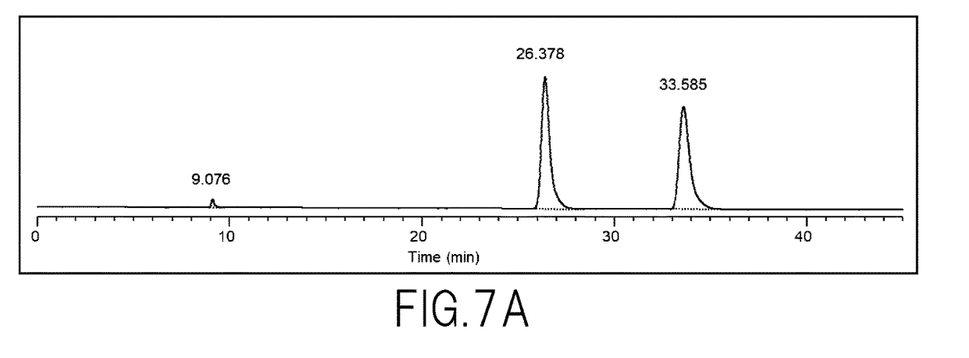
FIG. 7A is a chromatogram obtained by using a column produced using the column tube in Example 1.
Figure 7B:
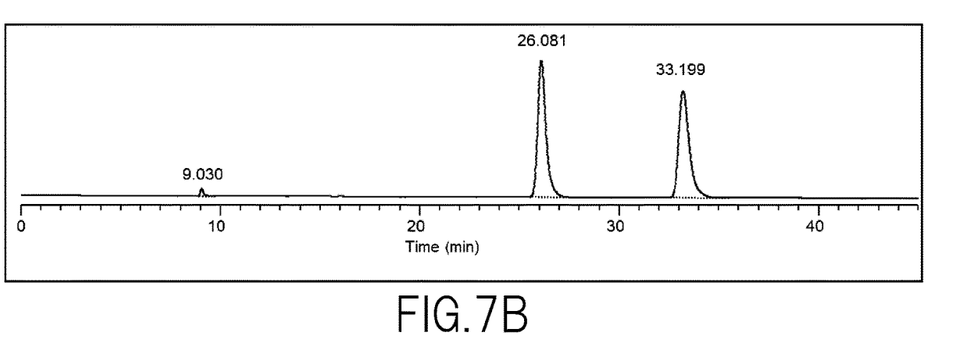
FIG. 7B is a chromatogram obtained by using a column produced using the column tube in Example 2.
Figure 7C:
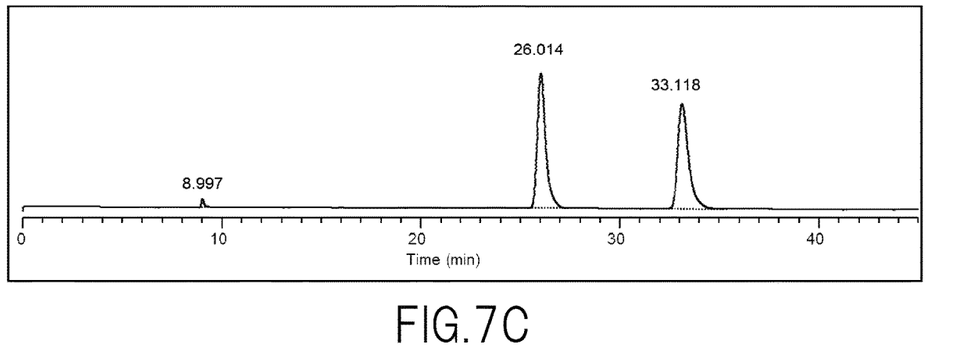
FIG. 7C is a chromatogram obtained by using a column produced using the column tube in Example 3.
Figure 8A:
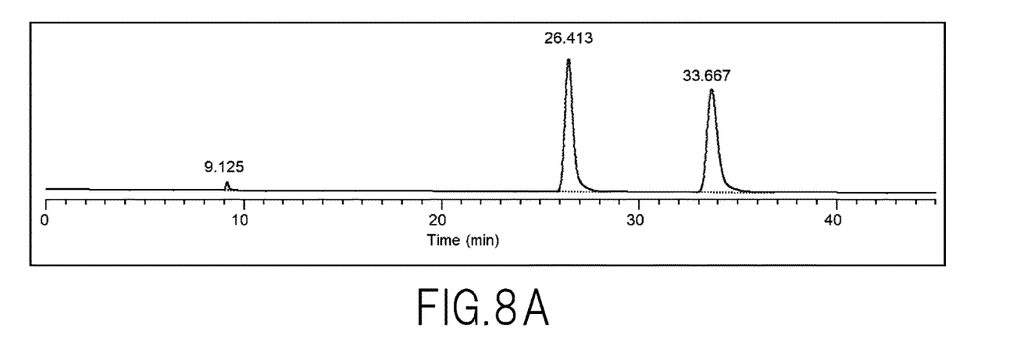
FIG. 8A is a chromatogram obtained by using a column produced using the column tube in Comparative Example 1.
Figure 8B:
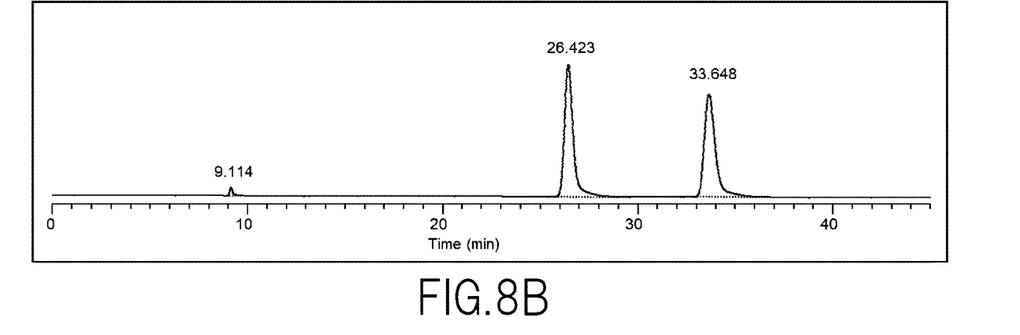
FIG. 8B is a chromatogram obtained by using a column produced using the column tube in Comparative Example 2.

The results in FIG. 9 indicate that no foot was generated at the peak end portion shown in FIGS. 7A to 7C in which the column tubes produced in Examples were used as the column bodies ((b) in FIG. 10). In contrast, a foot was generated at the peak end portion as shown in FIGS. 8A and 8B in which the column tubes produced in Comparative Examples were used as the column bodies ((d) and (e) in FIG. 10).

The invention claimed is:

1. A column comprising:
  a column tube, in which a fluid flows, the column tube including,
    a plurality of polishing traces extending at an angle of 30° or less with respect to a longitudinal axial direction of the column tube, on an inner circumferential surface of the column tube; and
  a separating agent filled inside the column tube.

2. The column according to claim 1, wherein the plurality of polishing traces exists over an area that accounts for 90% or higher of a total area of the inner circumferential surface.

3. The column according to claim 1, wherein a ratio, to a total number of polishing traces, of a number of polishing traces having a depth in a range from 0.01 μm to 50 μm and a width in a range from 0.01 μm to 100 μm is 70% or higher.

4. The column according to claim 1, wherein a number of the plurality of polishing traces is equal to or more than 90% of the total number of polishing traces.

5. The column tube according to claim 1, wherein the column tube has an inner diameter from 0.7 mm to 200 mm.

6. The column according to claim 1, further comprising:
  a connector configured to connect the column tube and tubing, through which the fluid flows.

7. The column according to claim 1, wherein the column is used for high performance liquid chromatography or supercritical fluid chromatography.

8. A method for manufacturing a column tube according to claim 1,
  the method comprising:
    providing polishing traces to an inner circumferential surface of a tube material in a longitudinal axial direction of the tube material by inserting a polishing shaft rod having a polishing member into the tube material and reciprocating the tube material.

9. A method of chromatography, comprising
  a step of flowing a fluid through a column tube according to claim 1; and
  a step of filling the column tube with a separating agent, wherein
  the column tube comprises the plurality of polishing traces extending in a longitudinal direction of the column tube, on an inner circumferential surface of the column tube to prevent a foot at a peak end portion of a chromatogram.

10. The method of chromatography according to claim 9, wherein the polishing traces extending in the longitudinal direction of the column tube exist over an area that accounts for 90% or higher of a total area of the inner circumferential surface.

11. The method of chromatography according to claim 9, wherein a ratio, to a total number of polishing traces, of a number of polishing traces having a depth in a range from 0.01 μm to 50 μm and a width in a range from 0.01 μm to 100 μm is 70% or higher.

12. The method of chromatography according to claim 9, wherein the number of polishing traces extending in the longitudinal direction of the column tube is equal to or more than 90% of the total number of polishing traces.

13. The method of chromatography according to claim 9, which has an inner diameter from 0.7 mm to 200 mm.

* * * * *